US012657775B2

(12) United States Patent
Ishikawa

(10) Patent No.: US 12,657,775 B2
(45) Date of Patent: Jun. 16, 2026

(54) CODING DEVICE, CODING METHOD, DECODING DEVICE, AND DECODING METHOD

(71) Applicant: CANON KABUSHIKI KAISHA, Tokyo (JP)

(72) Inventor: Yugo Ishikawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 152 days.

(21) Appl. No.: 18/438,695

(22) Filed: Feb. 12, 2024

(65) Prior Publication Data

US 2024/0289991 A1 Aug. 29, 2024

(30) Foreign Application Priority Data

Feb. 28, 2023 (JP) ................................. 2023-029293

(51) Int. Cl.
*G06T 9/00* (2006.01)

(52) U.S. Cl.
CPC ...................................... *G06T 9/00* (2013.01)

(58) Field of Classification Search
CPC ........................................................ G06T 9/00
See application file for complete search history.

(56) References Cited

U.S. PATENT DOCUMENTS

| | | | | |
|---|---|---|---|---|
| 11,461,932 | B2 | 10/2022 | Gao | |
| 11,538,196 | B2 * | 12/2022 | Mammou | G06T 9/004 |
| 2020/0394822 | A1 | 12/2020 | Gao | |
| 2021/0312670 | A1 * | 10/2021 | Mammou | G06T 9/40 |
| 2022/0270282 | A1 * | 8/2022 | Akutsu | G06T 7/70 |
| 2022/0353531 | A1 | 11/2022 | Hur | |

FOREIGN PATENT DOCUMENTS

| | | | | | |
|---|---|---|---|---|---|
| EP | 4124032 | A1 * | 1/2023 | ............. | H04N 19/70 |
| EP | 3800892 | B1 * | 3/2025 | ............. | H04N 19/96 |
| JP | 2022-518888 | A | 3/2022 | | |
| WO | WO-2021084295 | A1 * | 5/2021 | ............. | G06T 9/40 |

OTHER PUBLICATIONS

"Information technology—coded representation of immersive media—Part 9: Geometry-based point cloud compression," ISO/IEC FDIS 23090-9:2022(E); 132. MPEG Meeting, Oct. 12, 20201-Oct. 16, 2020, Online, (Motion Picture Expert Group or ISO/IEC JTC1/SC29/WG11), No. n19617, Apr. 12, 2022 (Apr. 12, 2022), XP030304108.

Shuo Gao, et al. (Xiaomi), "[G-PCC][EE13.51 related] Improve Lossy Predictive Tree by Disabling Cartesian Residual Coding," 138, MPEG Meeting, Apr. 25, 2022-Apr. 29, 2022, Online, (Motion Picture Expert Group or ISO/IEC JTC1/SC29/WG11), No. m59483, Apr. 29, 2022 (Apr. 29, 2022), XP030301595.

Jun. 18, 2024 European Official Action in European Patent Appln. No. 24158060.4.

* cited by examiner

*Primary Examiner* — Xiao M Wu
*Assistant Examiner* — Ahmed Taha
(74) *Attorney, Agent, or Firm* — Venable LLP

(57) ABSTRACT

A coding device includes: a target point data acquisition unit configured to acquire target point attribute data indicating an attribute of a target point that is included in point cloud data and is a target of processing of predicting a position; and a target point position data coding unit configured to generate a target point position bit stream indicating the position of the target point by coding target point position data indicating the position of the target point based on the target point attribute data.

2 Claims, 13 Drawing Sheets

| NODE | n2 | n1 | n0 | n |
|------|------|------|------|------|
| TIME STAMP | Time(n2) | Time(n1) | Time(n0) | Time(n) |
| POSITION | Pos(n2) | Pos(n1) | Pos(n0) | Pos(n) |

FIG. 8

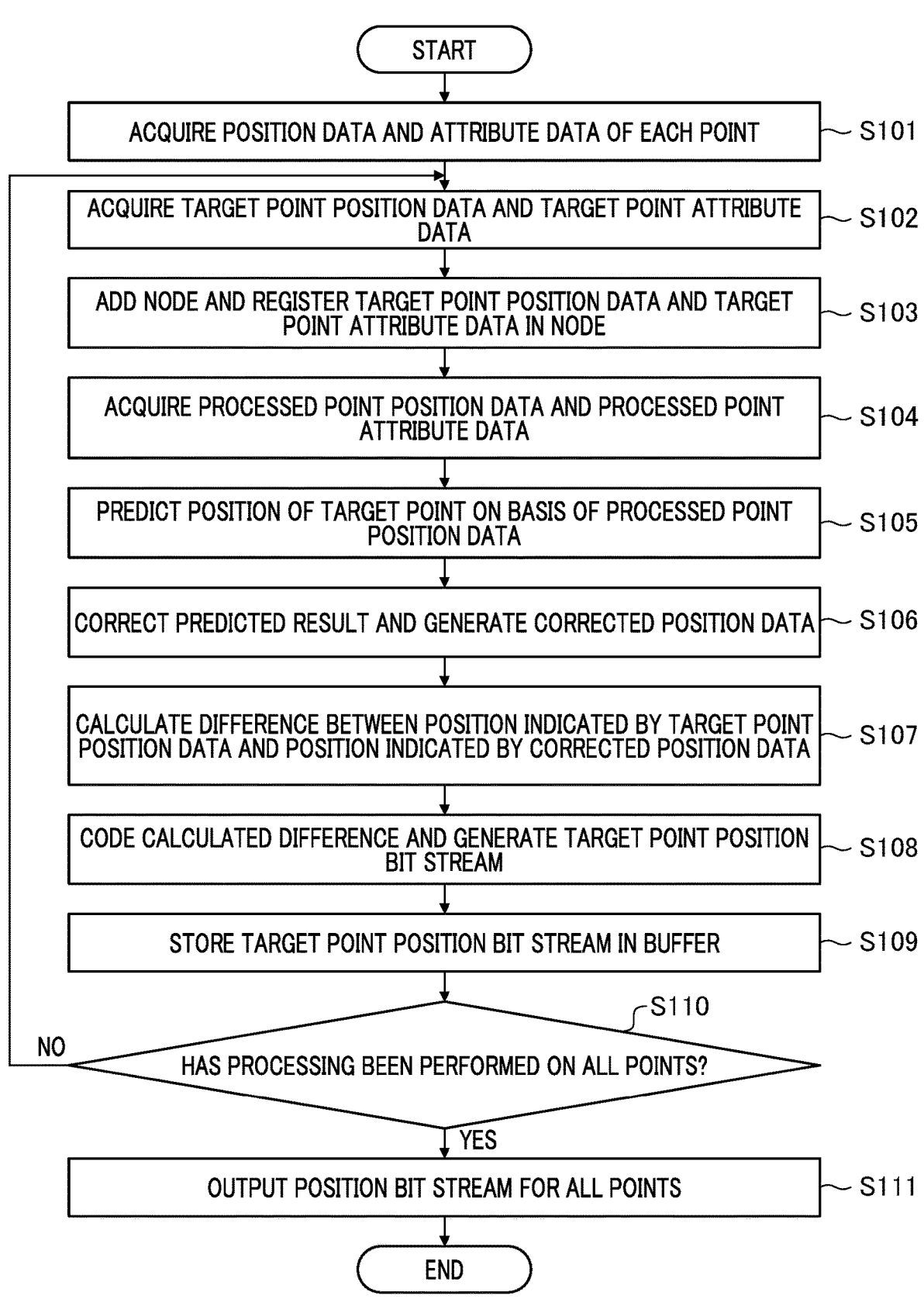

START

ACQUIRE POSITION DATA AND ATTRIBUTE DATA OF EACH POINT ～ S101

ACQUIRE TARGET POINT POSITION DATA AND TARGET POINT ATTRIBUTE DATA ～ S102

ADD NODE AND REGISTER TARGET POINT POSITION DATA AND TARGET POINT ATTRIBUTE DATA IN NODE ～ S103

ACQUIRE PROCESSED POINT POSITION DATA AND PROCESSED POINT ATTRIBUTE DATA ～ S104

PREDICT POSITION OF TARGET POINT ON BASIS OF PROCESSED POINT POSITION DATA ～ S105

CORRECT PREDICTED RESULT AND GENERATE CORRECTED POSITION DATA ～ S106

CALCULATE DIFFERENCE BETWEEN POSITION INDICATED BY TARGET POINT POSITION DATA AND POSITION INDICATED BY CORRECTED POSITION DATA ～ S107

CODE CALCULATED DIFFERENCE AND GENERATE TARGET POINT POSITION BIT STREAM ～ S108

STORE TARGET POINT POSITION BIT STREAM IN BUFFER ～ S109

S110

NO

HAS PROCESSING BEEN PERFORMED ON ALL POINTS?

YES

OUTPUT POSITION BIT STREAM FOR ALL POINTS ～ S111

END

FIG. 11

CODING DEVICE, CODING METHOD, DECODING DEVICE, AND DECODING METHOD

BACKGROUND OF THE INVENTION

Field of the Invention

The present invention relates to a coding device, a coding method, a decoding device, a decoding method, and the like.

Description of the Related Art

Development of technology of taking advantage of point cloud data generated by a light detection and ranging (LiDAR) and the like for the purpose of assisting driving of vehicles, for the purpose of realizing autonomous movement of automated guided vehicles (AGVs), and the like has advanced recently.

Since point cloud data typically includes data accompanying multiple points and each point, a long time may be needed for transmission and reception, storing in a storage medium, and the like. Examples of technologies to address such a problem include a method for point cloud compression disclosed in Japanese Translation of PCT International Application Publication No. 2022-518888.

According to this method, data in a two-dimensional matrix representing points and having a first dimension and a second dimension is compressed, and a bit stream including compressed data in the two-dimensional matrix is generated.

However, since the method according to Japanese Translation of PCT International Application Publication No. 2022-518888 is on the assumption of a rotation-type LiDAR based on a scheme in which a point generation clock time is constant, and a position of a newly input point is predicted based on positions of a plurality of points input in the past, an error included in prediction may increase and efficiency in coding may be degraded in a case of a rotation-type LiDAR or a non-rotation-type LiDAR based on a scheme in which intervals of point generation clock times are not constant.

SUMMARY OF THE INVENTION

A coding device according to an aspect of the present invention includes: at least one processor or circuit configured to function as: a target point data acquisition unit configured to acquire target point attribute data indicating an attribute of a target point that is included in point cloud data and is a target of processing of predicting a position; and a target point position data coding unit configured to generate a target point position bit stream indicating the position of the target point by coding target point position data indicating the position of the target point based on the target point attribute data.

Further features of the present invention will become apparent from the following description of embodiments with reference to the attached drawings.

BRIEF DESCRIPTION OF THE DRAWINGS

FIG. 3 is a diagram illustrating an example of a decomposition module, a coding device, and a synthesis module according to a first embodiment.

FIG. 5 is a diagram for explaining an example of processing executed by the position data coding module according to the first embodiment.

FIG. 6 is a diagram illustrating an example of nodes, time stamps, and positions related to points included in point cloud data according to the first embodiment.

FIG. 8 is a flowchart illustrating an example of processing executed by a position data coding module according to the first embodiment.

FIG. 11 is a diagram for explaining an example of processing executed by the position bit stream decoding module according to the second embodiment.

DESCRIPTION OF THE EMBODIMENTS

Hereinafter, with reference to the accompanying drawings, favorable modes of the present invention will be described using Embodiments. In each diagram, the same reference signs are applied to the same members or elements, and duplicate description will be omitted or simplified.

Concerning G-PCC

First, processing of coding a difference between a result of predicting a position of a point by predictive coding and a position of a point will be described with reference to FIG. 1.

Predictive coding (Predictive Geometry Coding) is a form of Geometry based Point Cloud Compression (G-PCC) included in Moving Picture Experts Group (MPEG). Note that G-PCC is disclosed in the document "ISO/IEC JTC 1/SC 29/WG7N 0151, G-PCC codec description v12, July 2021".

Predictive coding is a method of predicting a position of an input point based on positions of points input in the past and coding a difference between the position of the input point and the predicted position. Also, point cloud data is managed by creating a tree (prediction tree) in a case where predictive coding is applied.

The tree is a plurality of coupled nodes. Data indicating information regarding individual points is registered in the individual nodes. For example, position data indicating the positions of the points and attribute data indicating information other than the positions of the points are registered in the individual nodes.

Also, the individual nodes hold identifiers that enable unique identification of ancestor nodes such as their parents and the like. The identifiers express that edges are present between the nodes and nodes that are parents of the nodes. Note that it is possible to arbitrarily create or update the tree based on the position of each point, and edges are typically created between close nodes.

Figure 1:
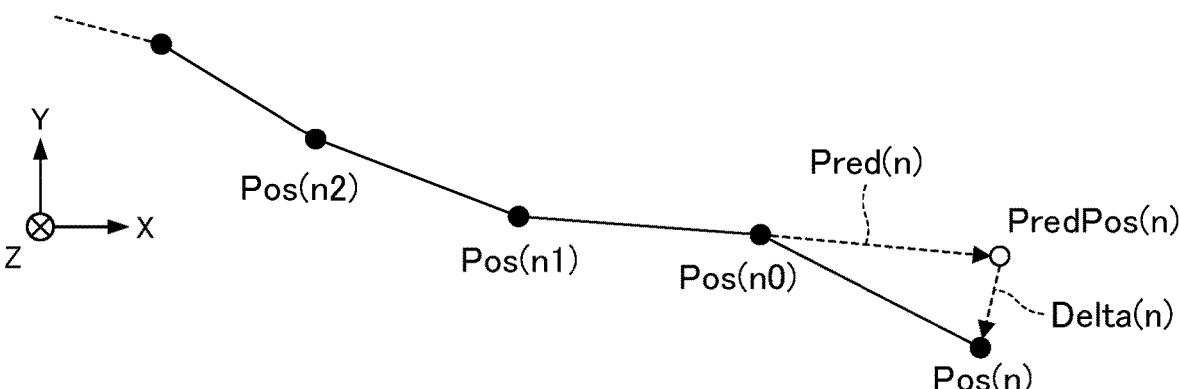
FIG. 1 is a diagram for explaining processing of coding a difference between a result of predicting a position of a point by predictive coding and a position of the point.

FIG. 1 is a diagram for explaining processing of coding a difference between a result of predicting a position of a point by predictive coding and the position of the point. FIG. 1 illustrates nodes inside a space defined by three-dimensional orthogonal coordinates of a left handed system having an X axis, a Y axis, and a Z axis.

A node n corresponds to a point that is a target of processing of predicting the position. A node n0 is a parent node of the node n. A node n1 is a parent node of the node n0. A node n2 is a parent node of the node n1.

In a case where a position of an arbitrary node x is represented as Pos(x), a prediction vector is represented as Pred(x), and a position of a node x predicted by predictive coding is represented as PredPos(x), Expressions (1) to (4) below are established. In the predictive coding, the position of the node n is predicted by using either Expressions (1) and (2) or Expressions (3) and (4).

$$Pred(n) = Pos(n0) - Pos(n1) \qquad \text{Expression (1)}$$

$$PredPos(n) = Pos(n0) + Pred(n) \qquad \text{Expression (2)}$$

$$Pred(n) = Pos(n0) = Pos(n2) \qquad \text{Expression (3)}$$

$$PredPos(n) = Pos(n1) + Pred(n) \qquad \text{Expression (4)}$$

Next, a difference Delta(n) between the position Pos(n) of the node n and the position PredPos(n) of the node n predicted by predictive coding is calculated by Expression (5) below.

$$Delta(n) = Pos(n) - PredPos(n) \qquad \text{Expression (5)}$$

Next, a position bit stream indicating the position of the node n is generated by arithmetic coding being applied to the difference Delta(n) and identifier of the node n0. Then, a coded bit stream is output by the position bit stream and an attribute bit stream that has been separately generated by applying coding to attribute data being synthesized.

In the predictive coding, coding efficiency increases as the difference Delta(n) decreases, and the coding efficiency decreases as the difference Delta(n) increases. In order to enhance the coding efficiency, it is necessary to improve accuracy of the position PredPos(n) of the node x predicted by predictive coding and to reduce the difference Delta(n).

Although the case where nodes are present inside the space defined by the three-dimensional orthogonal coordinates of the left handed system has been described as an example in the above description, the coordinate system defining the space is not particularly limited. For example, the space where nodes are present may be defined by a three-dimensional orthogonal coordinates of a right handed system.

Next, processing of decoding a coded bit stream will be described. The coded bit stream is separated into a position bit stream and an attribute bit stream. The difference Delta (n) and the identifier of the parent node n0 of the node n are generated by applying arithmetic decoding to the position bit stream.

A node corresponding to the decoded point is added to a tree based on the identifiers, the position of the node is predicted by the aforementioned method, and the position of the node is decoded by Expression (6) below. Thereafter, the attribute bit stream is decoded.

$$Pos(n) = Delta(n) + PredPos(n) \qquad \text{Expression (6)}$$

Figure 2:
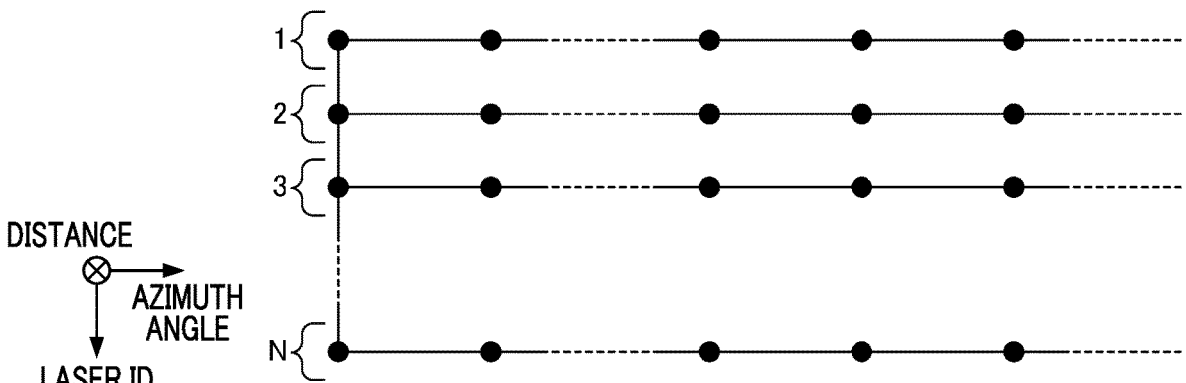
FIG. 2 is a diagram illustrating an example of a tree corresponding to point cloud data generated by a rotation-type LiDAR.

Next, a case where predictive coding is applied to point cloud data acquired by a rotation-type LiDAR will be described with reference to FIG. 2. FIG. 2 is a diagram illustrating an example of a tree corresponding to point cloud data generated by the rotation-type LiDAR.

Here, each point constituting the point cloud data is a measured point (measured data) measured by the rotation-type LiDAR. FIG. 2 illustrates a space defined by a three-dimensional orthogonal coordinates defined by an axis indicating the direction of an azimuth, an axis indicating a laser ID that is unique to each laser mounted on the rotation-type LiDAR, and an axis indicating the distance from each laser.

In the rotation-type LiDAR, an angle at which each laser emits laser light, that is, an elevation angle does not change. Therefore, it is possible to reduce the amount of data by using the laser ID instead of the elevation angle.

The natural number N illustrated in FIG. 2 represents the number of lasers and is, for example, "16" or "32". For the point acquired by using each laser, a node is added to include points previously acquired by using the same lasers as illustrated in FIG. 2, and a tree is thereby formed.

According to the technology described with reference to FIG. 1, the position of the point included in the input point cloud data is predicted based on positions of a plurality of points previously input. Therefore, in a case where intervals of clock times at which the respective points are acquired are not constant as in the aforementioned example of a LiDAR, a prediction error increases, and coding efficiency may be degraded according to the technology.

Thus, a technology for solving such a problem will be described below with reference to FIGS. 3 to 13. Note that the LiDAR is an example and the present technology can also be applied to other devices in which intervals of clock times when point clouds as targets of coding are acquired are not constant.

First Embodiment

Figure 3:
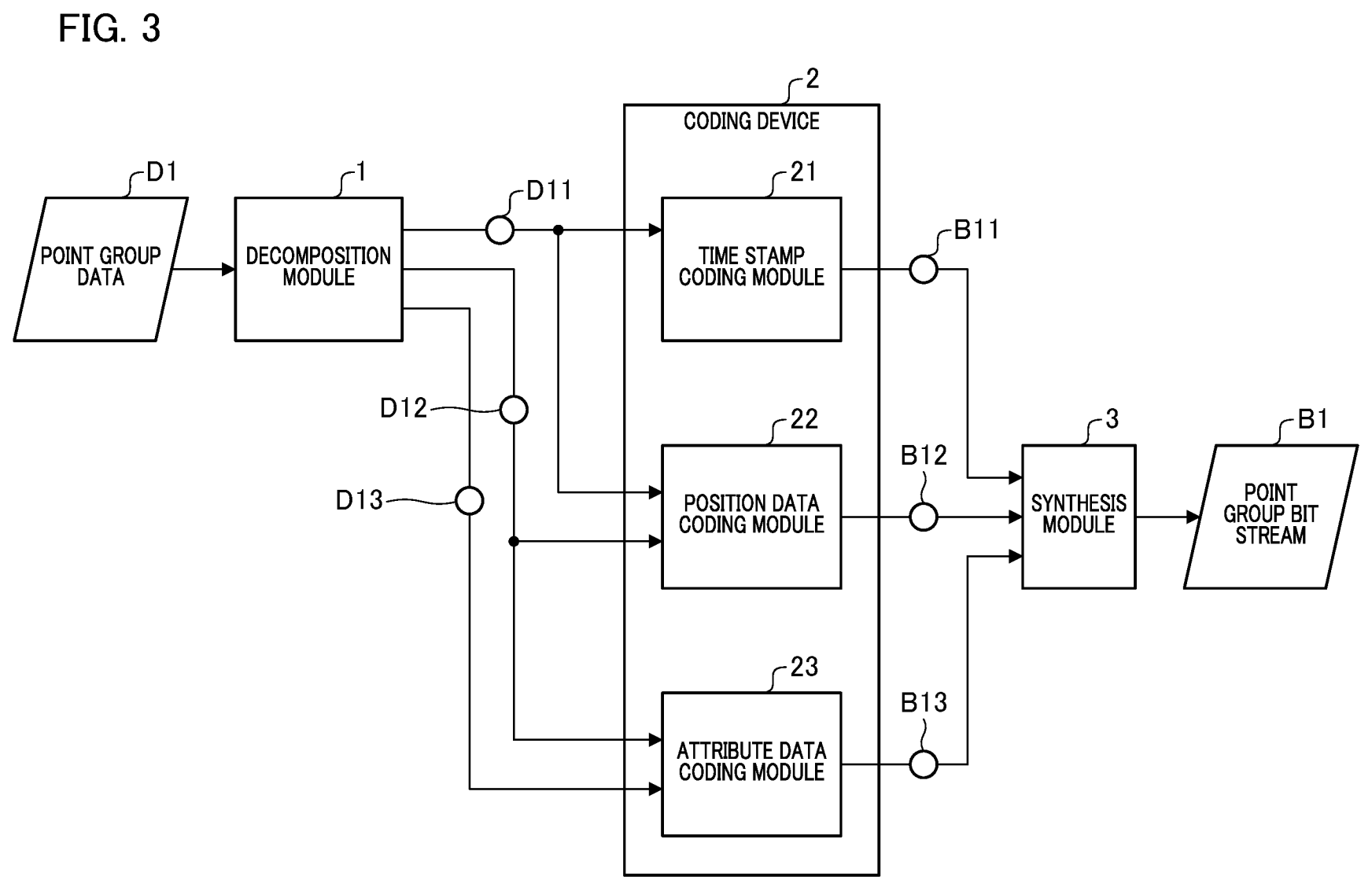

A coding device will be described with reference to FIGS. 3 to 8. FIG. 3 is a diagram illustrating an example of a decomposition module, a coding device, and a synthesis module according to a first embodiment. FIG. 3 illustrates a decomposition module 1, a coding device 2, and a synthesis module 3.

Point cloud data D1 is input to the decomposition module 1. The decomposition module 1 decomposes the point cloud data D1 into a time stamp D11, position data D12, and attribute data D13 and outputs them. The decomposition module 1 performs processing of decomposing each point constituting the input point cloud data D1 into the time stamp D11, the position data D12, and the attribute data D13.

The time stamp D11 is data indicating a clock time at which the point has been generated and is a kind of attribute data indicating an attribute of the point. The time stamp D11 is included in the point cloud data D1 and includes a target point time stamp indicating a clock time at which the target point as a target of processing of predicting the position has been generated. Moreover, the time stamp D11 is included in the point cloud data D1 and includes a processed point time stamp indicating a clock time when a processed point, on which the processing of predicting the position has been completed, has been generated.

The position data D12 is data indicating the position of the point. The position data D12 includes target point position data indicating the position of the target point and processed point position data indicating the position of the processed point. Both the target point and the processed point correspond to points or regions on the surface of the object irradiated with a laser, light, or the like by the rotation-type LiDAR or the like.

The attribute data D13 indicates attributes of the point other than the clock time at which the point has been generated. In other words, the attribute data D13 is data indicating various attributes of the point except for a time stamp. For example, the attribute data D13 is information indicating an intensity of emitted laser light that has been reflected at a predetermined point or in a region on the object surface and has been incident on a sensor configured by a light receiving unit and the like.

In addition to these, the attribute data D13 may include information indicating a color at a predetermined point or in a region on the object surface acquired by a camera, information representing reliability of point data such as an SN ratio calculated from the intensity of incident laser light and the amount of background light such as sunlight or the amount of noise inside the LiDAR, and information representing a normal line of the object surface.

The information indicating the color at the predetermined point or in the region on the object surface acquired by the camera may be red, green, blue (RGB) information that has been transferred from the image captured by the camera which is equipped with the rotation-type LiDAR to the point. Alternatively, the information indicating the color at the predetermined point or in the region on the object surface acquired by the camera may be RGB information output from an image sensor incorporated in the rotation-type LiDAR.

Also, the attribute data D13 includes target point attribute data indicating attributes of the target point and processed point attribute data indicating attributes of the processed point.

The coding device 2 includes a time stamp coding module 21, a position data coding module 22, and an attribute data coding module 23 as illustrated in FIG. 3.

The time stamp D11 is input to the time stamp coding module 21. The time stamp coding module 21 generates a time stamp bit stream B11 by applying an arbitrary coding method to the time stamp D11 and outputs the time stamp bit stream B11.

For example, the time stamp coding module 21 subtracts the clock time indicated by the processed point time stamp from the clock time indicated by the target point time stamp. Then, the time stamp coding module 21 generates the time stamp bit stream B11 by arithmetically coding the result of the subtraction. The processed point means a processed point generated just before the target point from among the processed points.

Also, the time stamp coding module 21 predicts a difference between the clock time indicated by the target point time stamp and the clock time indicated by the processed point time stamp, for example. Then, the time stamp coding module 21 generates a target point time stamp bit stream by arithmetically coding the result of predicting the difference.

Then, the time stamp coding module 21 outputs the time stamp bit stream B11 including the target point time stamp bit stream.

The time stamp D11 and the target point position data D12 are input to the position data coding module 22. The position data coding module 22 generates a target point position bit stream indicating the position of the target point by coding the target point position data based on the target point time stamp.

Then, the position data coding module 22 outputs a position bit stream B12 including the target point position bit stream. Note that details of processing executed by the position data coding module 22 will be described later.

The position data D12 and the attribute data D13 are input to the attribute data coding module 23. The attribute data coding module 23 generates a target point attribute bit stream by coding target point attribute data. Then, the attribute data coding module 23 outputs an attribute bit stream B13 including the target point attribute bit stream.

The time stamp bit stream B11, the position bit stream B12, and the attribute bit stream B13 are input to the synthesis module 3. The synthesis module 3 generates a point cloud bit stream B1 by synthesizing the time stamp bit stream B11, the position bit stream B12, and the attribute bit stream B13 and outputs the point cloud bit stream B1.

Figure 4:
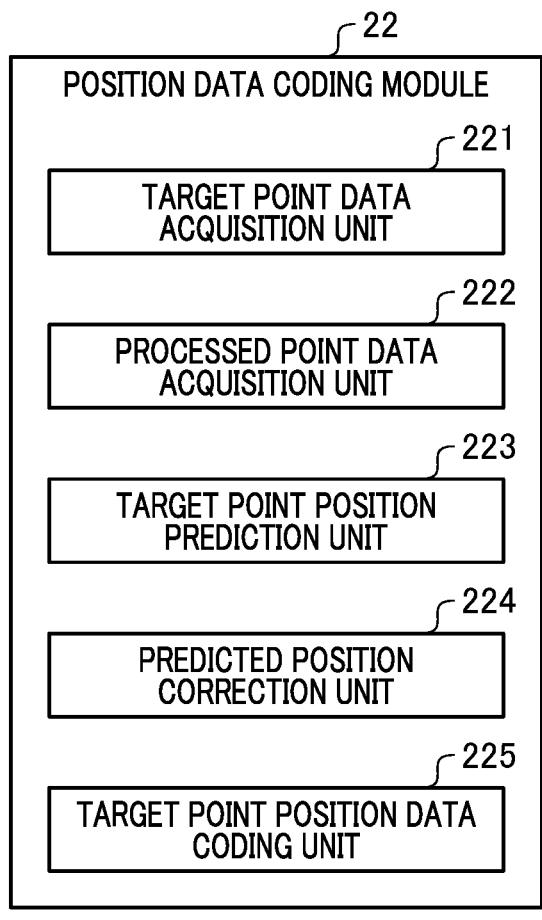
FIG. 4 is a diagram illustrating an example of a software configuration of a position data coding module according to the first embodiment.

Next, details of processing executed by the position data coding module 22 will be described with reference to FIGS. 4 to 7. FIG. 4 is a diagram illustrating an example of a software configuration of the position data coding module according to the first embodiment.

As illustrated in FIG. 4, the position data coding module 22 includes a target point data acquisition unit 221, a processed point data acquisition unit 222, a target point position prediction unit 223, a predicted position correction unit 224, and a target point position data coding unit 225.

Figure 5:
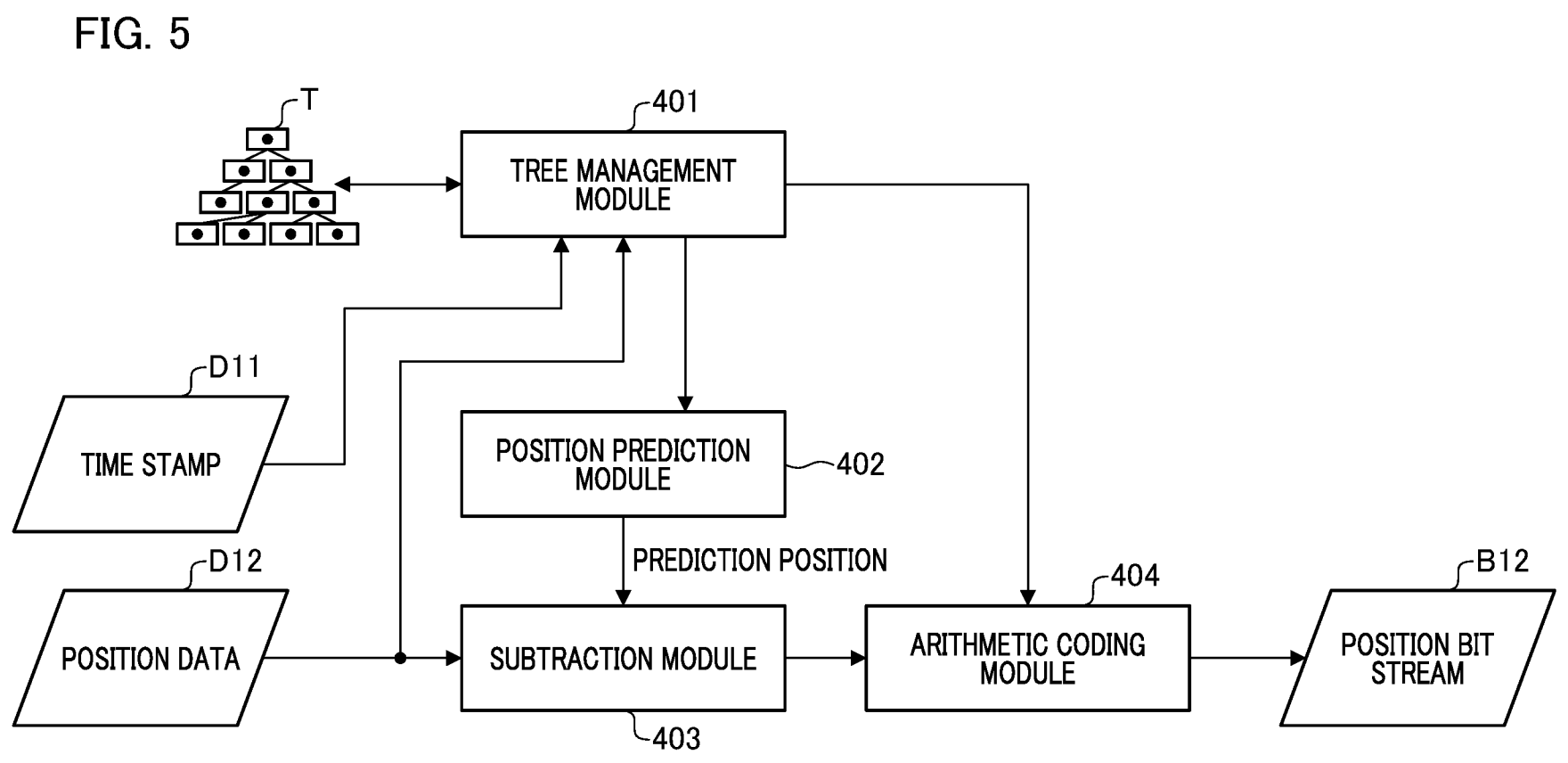

FIG. 5 is a diagram for explaining an example of processing executed by the position data coding module according to the first embodiment. FIG. 5 illustrates a tree management module 401, a position prediction module 402, a subtraction module 403, and an arithmetic coding module 404.

The target point data acquisition unit 221 acquires a target point time stamp indicating a clock time at which a target point included in point cloud data has been generated. Also, the target point data acquisition unit 221 acquires target point position data indicating the position of the target point.

For example, the target point data acquisition unit 221 adds a node corresponding to the target point to a tree T and controls the tree management module 401 to register a target point time stamp and target point position data to the node.

Note that the tree T used by the position data coding module 22 is different from the tree used in the technology described above with reference to FIG. 1, and not only the position data of the point but also the attribute data indicating the clock time at which the point has been generated and the like are registered in each node.

Also, every time a point is acquired by the LiDAR and a target point is generated, a node corresponding to the target point is newly added to the tree T used by the position data coding module 22. However, the tree T used by the position data coding module 22 may be generated by another method.

The processed point data acquisition unit 222 acquires processed point position data indicating a position of a processed point, which is included in point cloud data, on which processing of predicting the position has been completed. Also, the processed point data acquisition unit 222 acquires processed point attribute data indicating attributes of the processed point.

Note that the processed point position data and the processed point attribute data are registered by the tree management module 401 in an ancestor node of the node corresponding to the target point in the tree T, for example. Additionally, the processed point data acquisition unit 222 outputs the acquired processed point position data and processed point attribute data to the position prediction module 402, for example.

The target point position prediction unit 223 predicts the position of the target point based on the processed point position data. For example, the target point position prediction unit 223 controls the position prediction module 402 to predict the position of the target point based on the processed point position data registered in the ancestor node.

FIG. 6 is a diagram illustrating an example of nodes, time stamps, and positions related to points included in point cloud data according to the first embodiment. The first row from the top in FIG. 6 illustrates a node n that is a target point, a node n0 that is a parent of the target node, a node n1 that is a parent of the node n0, and a node n2 that is a parent of the node n1.

The second row from the top in FIG. 6 illustrates clock times indicated by the time stamps registered in the respective nodes illustrated in the first row from the top in FIG. 6. The third row from the top in FIG. 6 illustrates the positions of the respective nodes illustrated in the first row from the top in FIG. 6.

In the present embodiment, the interval between a clock time Time(n2) and a clock time Time(n1) is equal to the interval between the clock time Time(n1) and a clock time Time(n0). On the other hand, the interval between the clock time Time(n) and the clock time Time(n0) is longer than the interval between a clock time Time(n2) and the clock time Time(n1) and the interval between the clock time Time(n1) and the clock time Time(n0). In other words, Expressions (7) and (8) below are established.

$$\text{Time}(n) - \text{Time}(n0) > \text{Time}(n0) - \text{Time}(n1) \qquad \text{Expression (7)}$$

$$\text{Time}(n) - \text{Time}(n1) > \text{Time}(n0) - \text{Time}(n2) \qquad \text{Expression (8)}$$

Figure 7:
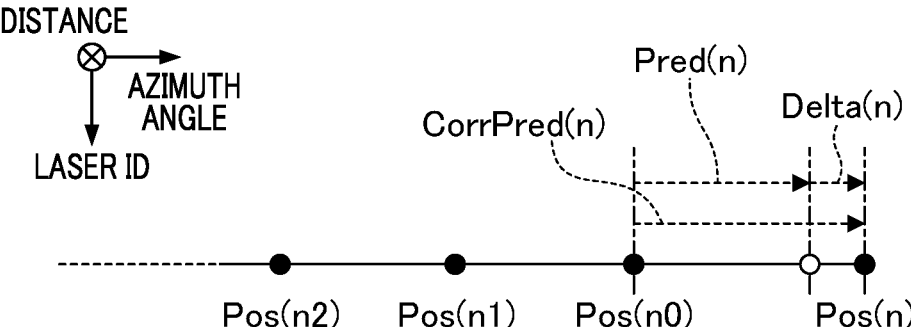
FIG. 7 is a diagram illustrating an example of a part of a tree according to the first embodiment.

FIG. 7 is a diagram illustrating an example of a part of the tree according to the first embodiment. FIG. 7 illustrates a space defined by a three-dimensional orthogonal coordinates defined by an axis indicating a direction of an azimuth, an axis indicating a laser ID unique to each laser mounted on the rotation-type LiDAR, and an axis indicating the distance from each laser. The node n2, the node n1, and the node n0 correspond to a series of points acquired by one laser.

In a case where the rotation-type LiDAR rotates in the azimuth direction at a constant speed, the interval between the nodes is proportional to the interval between the clock time indicated by the time stamps registered in each node. Therefore, the position Pos(n2) of the node n2, the position Pos(n1) of the node n1, and the position Pos(n0) of the node n0 are located at equal intervals along the axis indicating the direction of the azimuth.

On the other hand, the interval between the position Pos(n0) of the node n0 and the position Pos(n) of the node n is longer than the intervals of the position Pos(n2) of the node n2, the position Pos(n1) of the node n1, and the position Pos(n0) of the node n0.

This is because the interval between the clock time Time(n) and the clock time Time(n0) is longer than the interval between the clock time Time(n2) and the clock time Time(n1) and the interval between the clock time Time(n1) and the clock time Time(n0) as described above.

Note that the white circle illustrated in FIG. 7 indicates the position predicted by the technology described above with reference to FIG. 1. The position Pos(n) of the node n is located on the side further rightward than the white circle because the interval between the clock time Time(n) and the clock time Time(n0) is longer than the other intervals between clock times.

A prediction vector Pred(n) indicating the position predicted by the technology described above with reference to FIG. 1 is represented by Expression (9) below.

$$Pred(n) = Pos(n0) - Pos(n1) \qquad \text{Expression (9)}$$

The predicted position correction unit 224 corrects the result of the target point position prediction unit 223 predicting the position of the target point based on target point attribute data and processed point attribute data and generates corrected position data. Also, the predicted position correction unit 224 outputs the corrected position data to the subtraction module 403, for example.

For example, the predicted position correction unit 224 corrects the aforementioned prediction vector by using the time intervals based on the intervals between the nodes being proportional to the intervals between the clock times indicated by the time stamps registered in the nodes and calculates a corrected prediction vector CorrPred(n). The corrected prediction vector CorrPred(n) is represented by Expression (10) below. Note that the symbol [x] included in Expression (10) represents the norm of the vector x.

$$\text{Expression (10)}$$

$$\text{Corr}Pred(n) = ([\text{Time}(n) - \text{Time}(n0)] \div ([\text{Time}(n0) - \text{Time}(n1)]) \times Pred(n)$$

The position PredPos(n) of the node n predicted by the target point position prediction unit 223 is represented by Expression (11) below.

$$PredPos(n) = Pos(n0) + \text{Corr}Pred(n) \qquad \text{Expression (11)}$$

Note that the prediction vector may be calculated by Expression (12) below instead of Expression (9) described above. Also, Expression (13) below may be used instead of Expression (10) described above for the corrected prediction vector.

$$Pred(n) = Pos(n0) - Pos(n2) \qquad \text{Expression (12)}$$

$$\text{Expression (13)}$$

$$\text{Corr}Pred(n) = ((\text{Time}(n) - \text{Time}(n1)) \div (\text{Time}(n0) - \text{Time}(n2))) \times Pred(n)$$

The target point position data coding unit 225 generates a target point position bit stream indicating the position of the target point by coding the target point position data indicating the position of the target point based on the target point attribute data.

Specifically, the target point position data coding unit 225 calculates a difference Delta(n) between the position Pos(n) indicated by the target point position data and the position PredPos(n) indicated by the corrected position data.

The difference between the position Pos(n) of the node n and the position PredPos(n) of the node n predicted by the target point position prediction unit 223 is represented by Expression (14) below.

$$\text{Delta}(n) = Pos(n) - PredPos(n) \qquad \text{Expression (14)}$$

For example, the target point position data coding unit 225 controls the subtraction module 403 such that the subtraction module 403 calculates the difference and outputs the arithmetic coding module 404. Also, in this case, the target point position data coding unit 225 provides an identifier of a parent node of the node corresponding to the target point to the arithmetic coding module 404, for example.

Then, the target point position data coding unit 225 generates a target point position bit stream by coding the difference. For example, the target point position data coding unit 225 controls the arithmetic coding module 404 such that the arithmetic coding module 404 generates the target point position bit stream by arithmetically coding the difference calculated by the target point position data coding unit 225 itself and the identifier of the parent node of the node corresponding to the target point.

Next, processing executed by the position data coding module 22 according to the first embodiment will be described with reference to FIG. 8. FIG. 8 is a flowchart illustrating an example of processing executed by the position data coding module according to the first embodiment. FIG. 8 illustrates an example of processing of coding target point position data and generating a target point position bit stream.

In Step S101, the target point data acquisition unit 221 acquires position data and attribute data of each point included in point cloud data.

In Step S102, the target point data acquisition unit 221 acquires target point position data and target point attribute data.

In Step S103, the target point data acquisition unit 221 adds a node to a tree and registers the target point position data and the target point attribute data acquired in Step S102 in the node.

In Step S104, the processed point data acquisition unit 222 acquires processed point position data and processed point attribute data included in an ancestor node from the tree.

In Step S105, the target point position prediction unit 223 predicts the position of the target point based on the processed point position data acquired in Step S104.

In Step S106, the predicted position correction unit 224 corrects the result predicted in Step S105 based on the target point attribute data and the processed point attribute data and generates corrected position data.

In Step S107, the target point position data coding unit 225 calculates a difference between the position indicated by the target point position data acquired in Step S102 and the position indicated by the corrected position data generated in Step S106.

In Step S108, the target point position data coding unit 225 generates a target point position bit stream by coding the difference calculated in Step S107.

In Step S109, the target point position data coding unit 225 stores the target point position bit stream generated in Step S108 in a buffer.

In Step S110, the coding device 2 determines whether or not the processing in Steps S102 to S109 has been performed on all the points included in the point cloud data.

The coding device 2 moves on to the processing in Step S111 in a case where it is determined that the processing in Steps S102 to S109 has been performed on all the points included in the point cloud data (Step S110: YES).

On the other hand, the coding device 2 moves on to the processing in Step S102 in a case where it is determined that the processing in Steps S102 to S109 has not been performed on all the points included in the point cloud data (Step S110: NO).

In Step S111, the coding device 2 outputs the position bit streams from the buffer for all the points included in the point cloud data.

The coding device 2 according to the first embodiment has been described hitherto. The coding device 2 acquires target point attribute data indicating attributes of a target point that is included in point cloud data and is a target of processing of predicting a position.

Then, the coding device 2 generates a target point position bit stream indicating the position of the target point by coding target point position data indicating the position of the target point based on the target point attribute data.

The coding device 2 can cause the difference Delta(n) to be smaller than that in a case where the position of the node n is predicted by using the prediction vector Pred(n) and improve coding efficiency by calculating the position PredPos(n) of the node n by using the corrected prediction vector CorrPred(n).

In other words, the coding device 2 can efficiently code the point cloud data even through the aforementioned processing even if the intervals of the clock times when the points included in the point cloud data have been generated are not constant.

Second Embodiment

Figure 9:
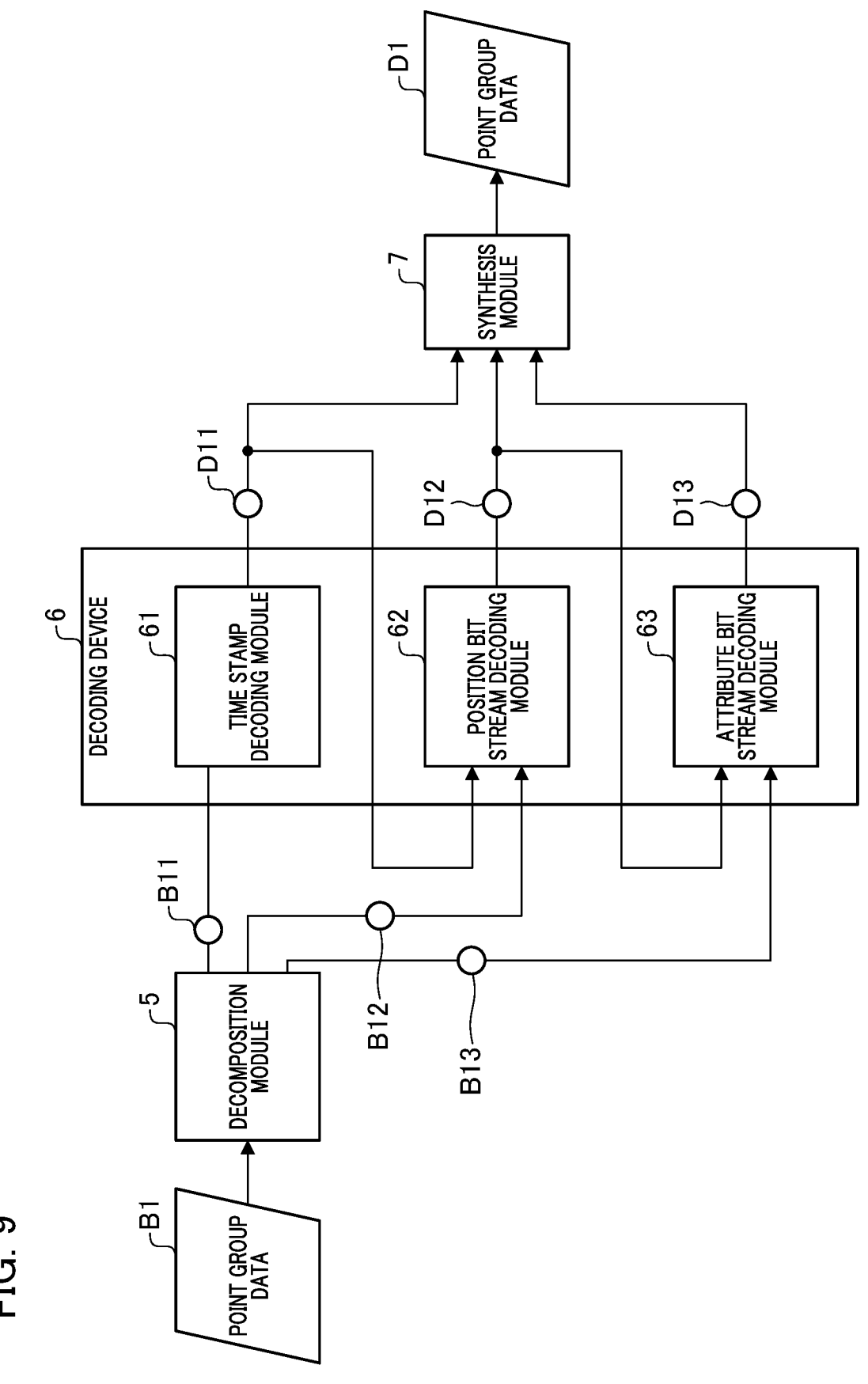
FIG. 9 is a diagram illustrating an example of a decomposition module, a decoding device, and a synthesis module according to a second embodiment.

A decoding device according to a second embodiment will be described with reference to FIGS. 9 to 12. FIG. 9 is a diagram illustrating an example of a decomposition module, a decoding device, and a synthesis module according to the second embodiment.

FIG. 9 illustrates a decomposition module 5, a decoding device 6, and a synthesis module 7. Note that, in description of the second embodiment, the same elements as those in the first embodiment will be denoted by the same reference signs and descriptions as the reference signs and descriptions used in the description of the first embodiment. Also, a tree T used in the second embodiment is the same as the tree T used in the first embodiment.

A point cloud bit stream B1 is input to the decomposition module 5. The decomposition module 5 decomposes the point cloud bit stream B1 into a time stamp bit stream B11, a position bit stream B12, and an attribute bit stream B13 and outputs them.

The time stamp bit stream B11 is a bit stream indicating a clock time at which the point has been generated and is a kind of attribute bit stream indicating an attribute of a point. The time stamp bit stream B11 is included in the point cloud bit stream B1 and includes a target point time stamp bit stream indicating the clock time at which the target point as a target of processing of predicting the position has been generated.

Also, the time stamp bit stream B11 is included in the point cloud bit stream B1 and includes a processed point time stamp bit stream indicating a clock time at which a processed point, which is included in the point cloud bit stream B11, on which the processing of predicting the position has been completed, has been generated.

The position bit stream B12 indicates a position of a point. The position bit stream B12 includes a target point position bit stream indicating the position of the target point.

The attribute bit stream B13 indicates attributes of the point other than the clock time at which the point has been generated. For example, the attribute bit stream B13 indicates an intensity of laser light that is reflected at a predetermined point or in a region on an object surface and is incident on a sensor, a color at a predetermined point or in a region on the object surface acquired by a camera equipped together with the LiDAR, information representing a reliability of data of the point such as an SN ratio, and information representing a normal line of the object surface.

Also, the attribute bit stream B13 includes a target point attribute bit stream indicating attributes of the target point and a processed point attribute bit stream indicating attributes of the processed point.

The decoding device 6 includes a time stamp decoding module 61, a position bit stream decoding module 62, and an attribute bit stream decoding module 63 as illustrated in FIG. 9.

The time stamp bit stream B11 is input to the time stamp decoding module 61. The time stamp decoding module 61 generates a time stamp D11 by applying an arbitrary decoding method to the time stamp bit stream B11 and outputs the time stamp D11.

For example, the time stamp decoding module 61 generates the time stamp D11 through decoding processing corresponding to the coding processing used by the time stamp coding module 21 according to the first embodiment.

The position bit stream B12 and the time stamp D11 are input to the position bit stream decoding module 62. The position bit stream decoding module 62 generates target point position data indicating the position of the target point by decoding the target point position bit stream.

Then, the position bit stream decoding module 62 outputs position data D12 including the target point position data. Note that details of processing executed by the position bit stream decoding module 62 will be described later.

An attribute bit stream B13 and the target point data D12 are input to the attribute bit stream decoding module 63. The attribute bit stream decoding module 63 generates target point attribute data by decoding the target point attribute bit stream. Then, the attribute bit stream decoding module 63 outputs attribute data D13 including the target point attribute data.

The time stamp D11, the position data D12, and the attribute data D13 are input to the synthesis module 7. The synthesis module 7 generates point cloud data D1 by synthesizing the time stamp D11, the position data D12, and the attribute data D13 and outputs the point cloud data D1.

Figure 10:
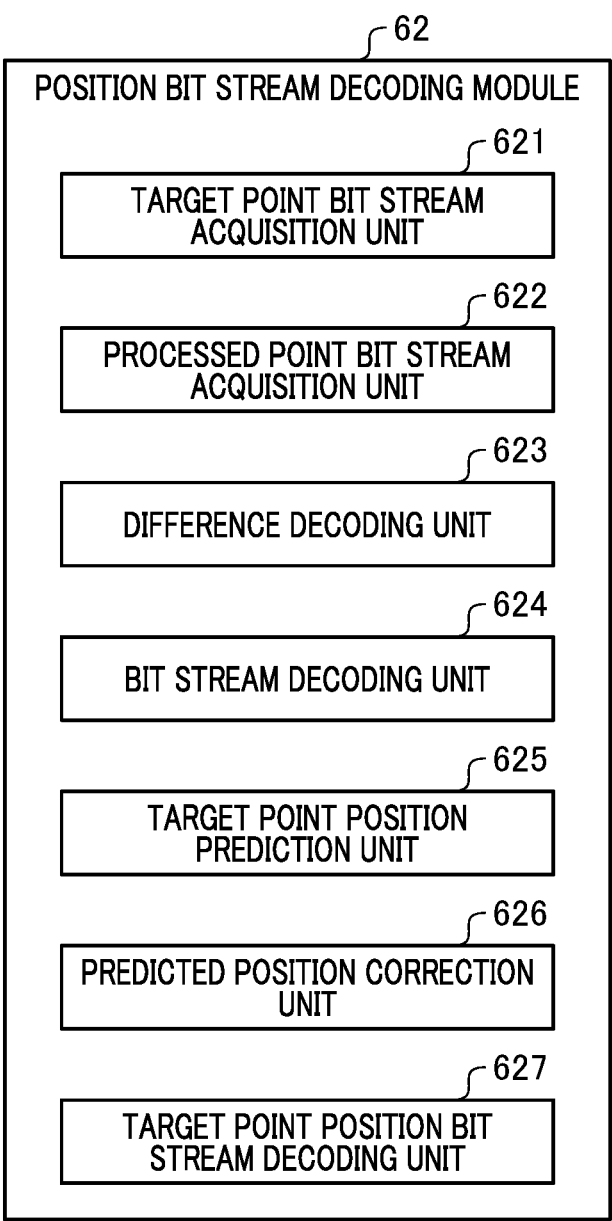
FIG. 10 is a diagram illustrating an example of a software configuration of a position bit stream decoding module according to the second embodiment.

Next, details of processing executed by the position bit stream decoding module 62 will be described with reference to FIGS. 10 and 11. FIG. 10 is a diagram illustrating an example of a software configuration of the position bit stream decoding module according to the second embodiment.

As illustrated in FIG. 10, the position bit stream decoding module 62 includes a target point bit stream acquisition unit 621, a processed point bit stream acquisition unit 622, a difference decoding unit 623, a bit stream decoding unit 624, a target point position prediction unit 625, a predicted position correction unit 626, and a target point position bit stream decoding unit 627.

Figure 11:
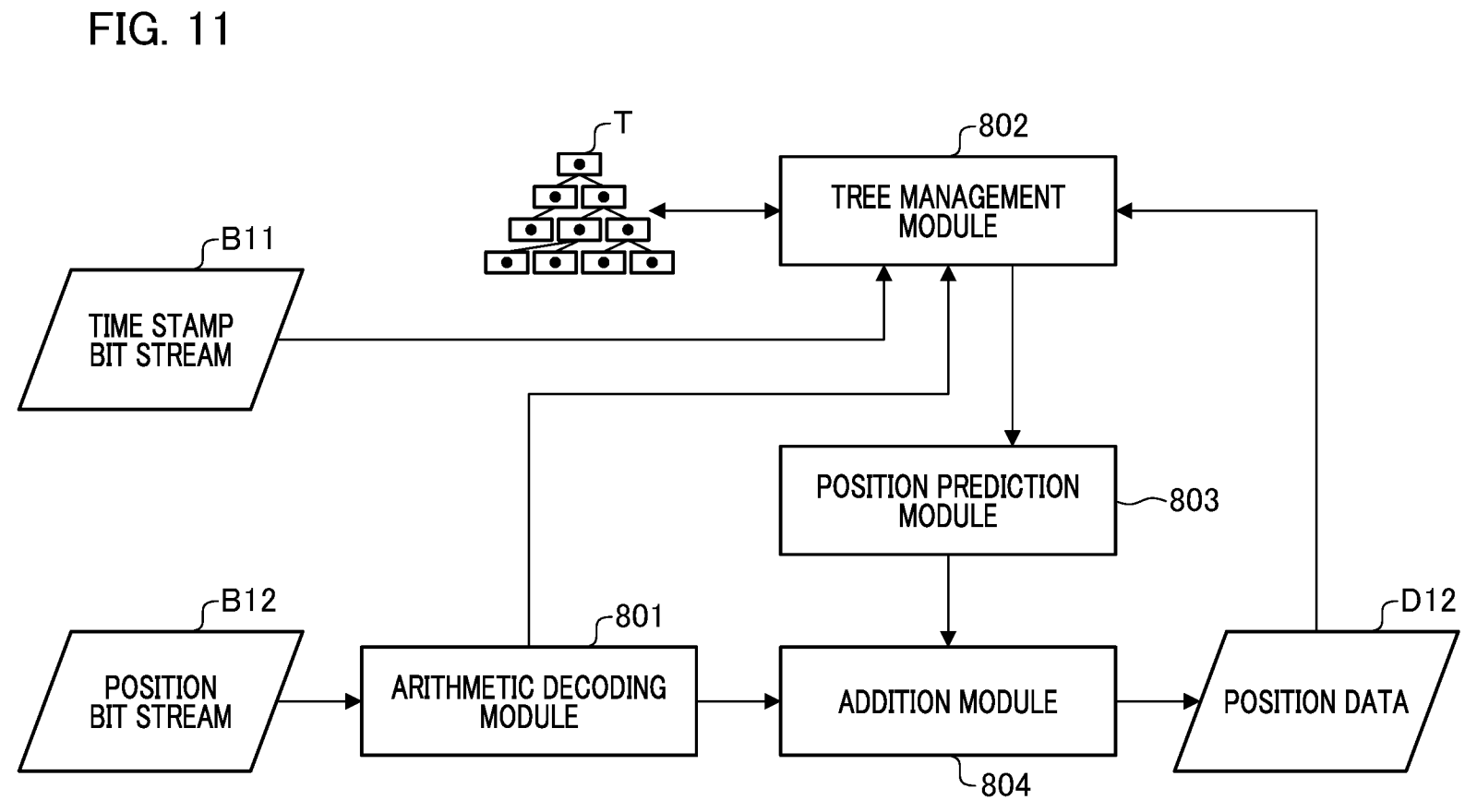

FIG. 11 is a diagram for explaining an example of processing executed by the position bit stream decoding module according to the second embodiment. FIG. 11 illustrates an arithmetic decoding module 801, a tree management module 802, a position prediction module 803, and an addition module 804.

The target point bit stream acquisition unit 621 acquires a target point attribute bit stream indicating attributes of a target point that is included in a point cloud bit stream and is a target of processing of predicting a position. Also, the target point bit stream acquisition unit 621 acquires a target point position bit stream indicating the position of the target point that is included in the point cloud bit stream and is a target of processing of predicting a position.

The target point bit stream acquisition unit 621 outputs a target point position bit stream to the arithmetic decoding module 801, for example.

The difference decoding unit 623 decodes a difference $Delta(n)$ between a position $Pos(n)$ and a predicted position $PredPos(n)$. For example, the difference decoding unit 623 controls the arithmetic decoding module 801 such that the arithmetic decoding module 801 decodes the difference $Delta(n)$ between the position $Pos(n)$ and the position $PredPos(n)$.

The bit stream decoding unit 624 generates a target point time stamp by decoding the target point attribute bit stream. The target point time stamp indicates the clock time $Time(n)$ included in the right side of Expression (10) described above.

For example, the bit stream decoding unit 624 controls the arithmetic decoding module 801 such that the arithmetic decoding module 801 generates the target point time stamp by decoding the target point attribute bit stream. Also, the bit stream decoding unit 624 controls the tree management module 802 such that the tree management module 802 specifies a node n0 that is a parent of a node n to be newly added, with reference to an identifier of each node.

Then, the bit stream decoding unit 624 controls the tree management module 802 such that the tree management module 802 adds the node n to the tree T and registers the target point time stamp indicating the clock time at which the point corresponding to the node n has been generated in the node n.

The bit stream decoding unit 624 acquires, from the tree T, the processed point time stamp and the processed point position data registered in each ancestor node of the node n, such as the node n0 and the node n1. Then, the bit stream decoding unit 624 outputs the processed point time stamp and the processed point position data to the position prediction module 803.

The target point position prediction unit 625 predicts the target point position based on the processed point position data. For example, the target point position prediction unit 625 controls the position prediction module 803 such that the position prediction module 803 predicts the position of the target point based on the processed point position data.

The predicted position correction unit 626 corrects Pred-Pos(n) that is the result predicted by the target point position prediction unit 625 based on the target point attribute data and the processed point attribute data and generates target point position data. In this stage, a corrected prediction vector CorrPred(n) in the left side of Expression (10) described above and PredPos(n) in the left side of Expression (11) described above are known.

For example, the predicted position correction unit 626 controls the position prediction module 803 such that the position prediction module 803 corrects the predicted result PredPos(n) based on the target point attribute data and the processed point attribute data and generates target point position data. Also, the predicted position correction unit 626 outputs the target point position data to the addition module 804, for example.

The target point position bit stream decoding unit 627 generates target point position data indicating the position of the target point by decoding the target point position bit stream indicating the position of the target point based on the target point attribute bit stream.

Specifically, the target point position bit stream decoding unit 627 generates the target point position data from the aforementioned difference Delta(n) and the result PredPos(n) of the target point position prediction unit 625 predicting the position. In this stage, Pos(n) included in Expression (12) described above is known.

For example, the target point position bit stream decoding unit 627 controls the addition module 804 such that the addition module 804 adds the aforementioned difference Delta(n) to the predicted result PredPos(n) and generates target point position data.

Also, the target point position bit stream decoding unit 627 controls the tree management module 802 such that the tree management module 802 registers the target point position data in the node n and stores it in the buffer.

Figure 12:
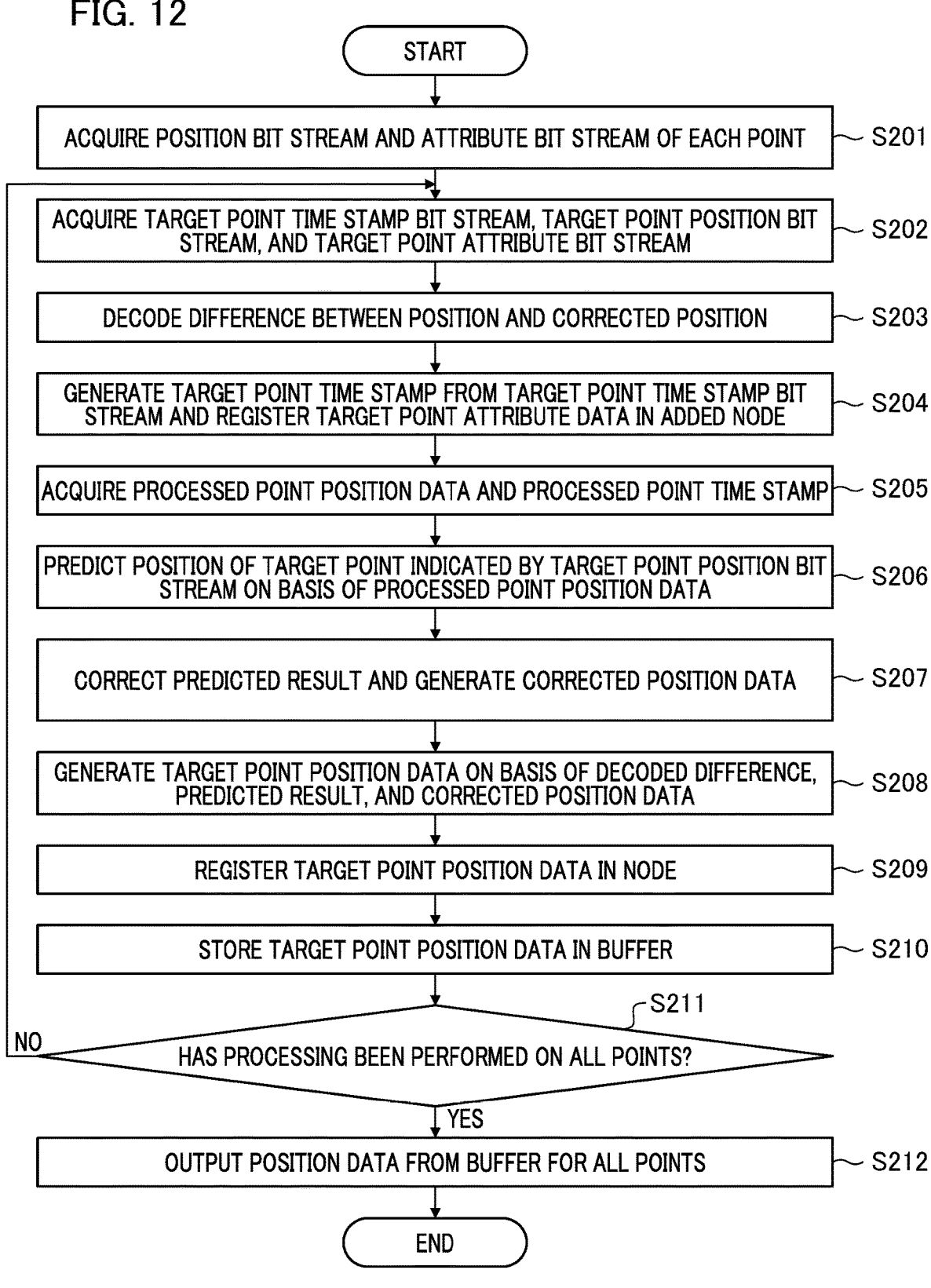
FIG. 12 is a diagram for explaining an example of the processing executed by the position bit stream decoding module according to the second embodiment.

Next, processing executed by the position bit stream decoding module 62 according to the second embodiment will be described with reference to FIG. 12. FIG. 12 is a diagram for explaining an example of processing executed by the position bit stream decoding module according to the second embodiment. FIG. 12 illustrates an example of processing of decoding a target point position bit stream and generating target point position data.

In Step S201, the target point bit stream acquisition unit 621 acquires a position bit stream and an attribute bit stream of each point included in a point cloud bit stream.

In Step S202, the target point bit stream acquisition unit 621 acquires a target point time stamp bit stream, a target point position bit stream, and a target point attribute bit stream.

In Step S203, the difference decoding unit 623 decodes a difference between the position and the corrected position.

In Step S204, the bit stream decoding unit 624 generates the target point time stamp by decoding the target point time stamp bit stream acquired in Step S202, adds a node to the tree, and registers target point attribute data in the node.

In Step S206, the bit stream decoding unit 624 acquires the processed point position data and the processed point time stamp from the tree.

In Step S207, the target point position prediction unit 625 predicts the position of the target point indicated by the target point position bit stream based on the processed point position data.

In Step S208, the predicted position correction unit 626 corrects the result predicted in Step S207 based on the target point time stamp generated in Step S204 and the processed point time stamp generated in Step S206 and generates corrected position data.

In Step S209, the target point position bit stream decoding unit 627 generates target point position data based on the difference decoded in Step S203, the result predicted in Step S207, and the corrected position data generated in Step S208.

In Step S210, the target point position bit stream decoding unit 627 registers the target point position data generated in Step S209 in the node added in Step S204.

In Step S211, the target point position bit stream decoding unit 627 stores the target point position data generated in Step S209 in the buffer.

In Step S212, the decoding device 6 determines whether or not the processing in Steps S202 to S211 has been performed on all the points included in the point cloud bit stream. The decoding device 6 moves on to the processing in Step S213 in a case where it is determined that the processing in Steps S202 to S211 has been performed on all the points included in the point cloud bit stream (Step S212: YES).

In Step S213, the decoding device 6 outputs the position data from the buffer for all the points included in the point cloud bit stream.

The decoding device 6 according to the second embodiment has been described hitherto. The decoding device 6 acquires a target point time stamp bit stream indicating attributes of a target point that is included in a point cloud bit stream and is a target of processing of predicting a position.

Then, the decoding device 6 generates target point position data indicating the position of the target point by decoding the target point position bit stream indicating the position of the target point based on the target point time stamp bit stream. In this manner, the decoding device 6 can efficiently decode the point cloud data even if the intervals of the clock times at which the points included in the point cloud data have been generated are not constant.

Third Embodiment

Many objects observed by a LiDAR are structures configured by surfaces of the same materials. Also, in a case where reflection of laser light at the surfaces is limited to diffuse reflection, points measured successively in the azimuth direction or the elevation angle direction have a characteristic that the intensity of laser light that is reflected at each position on the surfaces and is input to the sensor successively changes.

In a third embodiment, the predicted position of the target point is corrected and coding efficiency is improved by using such a characteristic.

Figure 13:
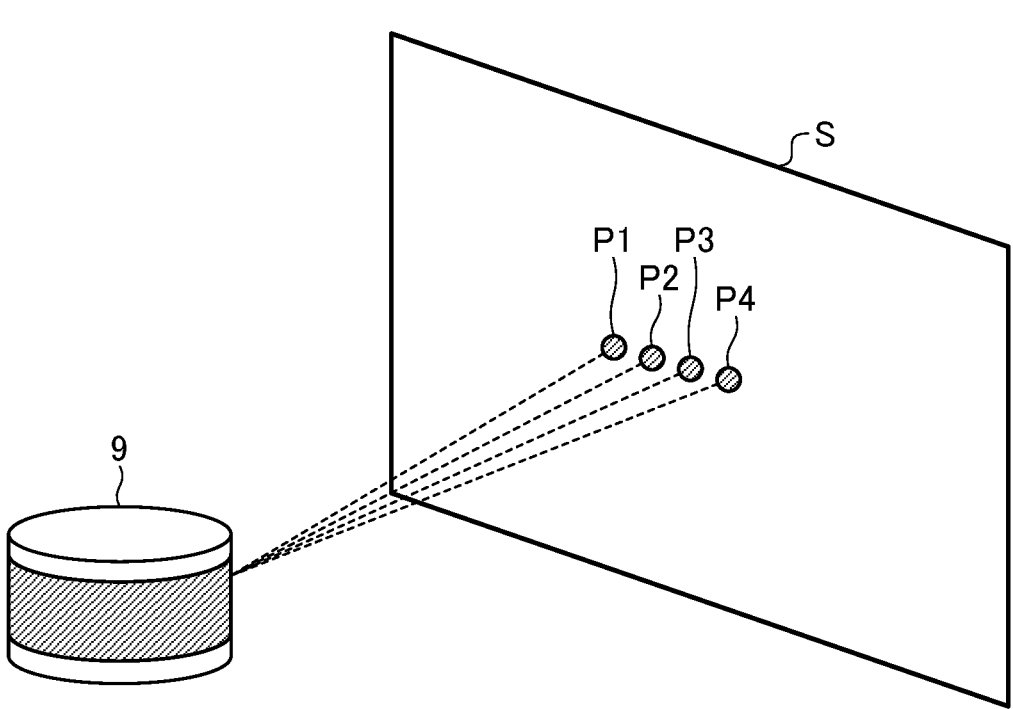
FIG. 13 is a diagram illustrating an example of a rotation-type LiDAR according to a third embodiment.

FIG. 13 is a diagram illustrating an example of a rotation-type LiDAR according to the third embodiment. FIG. 13 illustrates a rotation-type LiDAR 9, an object S, a point P1, a point P2, a point P3, and a point P4. The object S is an object on a flat plate disposed to directly confront the rotation-type LiDAR.

The rotation-type LiDAR 9 measures the surface of the object S and generates the point P1, the point P2, the point P3, and the point P4, for example. These four points are points that are successive in the azimuth direction by the same laser and constitute point cloud data.

The intensity of laser light is measured by inputting the laser light reflected at a point or in a region corresponding to each azimuth angle on the surface of the object S to a sensor mounted in the rotation-type LiDAR 9. Therefore, the intensity of the laser light varies depending on the distance to the surface of the object S, the angle, and the like and becomes a different value at each point due to the different position, angle, and the like at each of the point P1, the point P2, the point P3, and the point P4.

The intensity of the laser light successively varies for different points and thus smoothy increases or decreases in the azimuth angle. In a case where it is possible to regard the amount of change in intensity of laser light as being constant in the azimuth angle, it is possible to obtain similar effects even when the time stamp in at least one of the first embodiment and the second embodiment is replaced with the intensity of the laser light.

Also, the time stamp in at least one of the first embodiment and the second embodiment may be replaced with information indicating a color at a point or in a region on the object corresponding to the target point, the amount of background light, a reliability of the point, normal line information, and the like as well as the intensity of the laser light.

Note that although the object S on the flat plate has been described as an example in the third embodiment, the present invention is not limited thereto. In other words, the shape of the object S may be any shape.

While the present invention has been described with reference to exemplary embodiments, it is to be understood that the invention is not limited to the disclosed exemplary embodiments. The scope of the following claims is to be accorded the broadest interpretation to encompass all such modifications and equivalent structures and functions.

In addition, as a part or the whole of the control according to the embodiments, a computer program realizing the function of the embodiments described above may be supplied to the coding device or the like through a network or various storage media. Then, a computer (or a CPU, an MPU, or the like) of the coding device or the like may be configured to read and execute the program. In such a case, the program and the storage medium storing the program configure the present invention.

Additionally, the present invention includes implementation by using at least one processor or circuit configured to function of the embodiments explained above, for example. Note that a plurality of processors may be used and caused to perform distributed processing.

This application claims the benefit of Japanese Patent Application No. 2023-029293, filed on Feb. 28, 2023, which is hereby incorporated by reference herein in its entirety.

What is claimed is:

1. A coding device comprising:
at least one processor or circuit configured to function as:
(1) a target point data acquisition unit configured to (a) acquire target point attribute data indicating an attribute of a target point that is included in point cloud data and that is a target of processing of predicting a position, and (b) acquire target point position data indicating the position of the target point,
(2) a target point position data coding unit configured to generate a target point position bit stream indicating the position of the target point by coding the target point position data based on the target point attribute data,
(3) a processed point data acquisition unit configured to acquire (a) processed point position data indicating a position of a processed point, which is included in the point cloud data, on which processing of predicting a position has been completed, and (b) processed point attribute data indicating an attribute of the processed point,
(4) a target point position prediction unit configured to predict the position of the target point based on the processed point position data, and
(5) a predicted position correction unit configured to (a) correct a result of the target point position prediction unit predicting the position of the target point based on the target point attribute data and the processed point attribute data and (b) generate corrected position data,
wherein the target point position data coding unit generates a target point position bit stream by (a) calculating a difference between the position indicated by the target point position data and the position indicated by the corrected position data and (b) coding the difference, and
wherein the target point data acquisition unit acquires the target point attribute data indicating a clock time at which the target point has been generated.

2. A decoding device comprising:
at least one processor or circuit configured to function as
(1) a target point bit stream acquisition unit configured to (a) acquire a target point attribute bit stream indicating an attribute of a target point that is included in a point cloud bit stream and that is a target of processing of predicting a position, and (b) acquire a target point position bit stream indicating a position of a target point that is included in a point cloud bit stream and that is a target of processing of predicting a position
(2) a target point position bit stream decoding unit configured to generate target point position data indicating the position of the target point by decoding the target point position bit stream indicating the position of the target point based on the target point attribute bit stream,
(3) a processed point bit stream acquisition unit configured to acquire (a) a processed point position bit stream indicating a position of a processed point, which is included in the point cloud bit stream, on which the processing of predicting the position has been completed before the target point, and (b) a processed point attribute bit stream indicating an attribute of the processed point,
(4) a difference decoding unit configured to decode a difference between the position indicated by the target point position bit stream and a position indicated by a corrected position bit stream generated by correcting the position of the target point, predicted based on the processed point position bit stream, based on the target point attribute bit stream and the processed point attribute bit stream,
(5) a bit stream decoding unit configured to (a) generate target point attribute data by decoding the target point attribute bit stream and (b) acquire processed point attribute data and processed point position data,
(6) a target point position prediction unit configured to predict the position of the target point indicated by the target point position bit stream based on the processed point position data, and
(7) a predicted position correction unit configured to (a) correct a result of the target point position prediction unit predicting the position of the target point indicated by the target point position bit stream based on the target point attribute data and the processed point attribute data and (b) generate corrected position data, wherein the target point position bit stream decoding unit generates target point position data based on (a) the difference, (b) the result of the target point position prediction unit predicting the position of the target point indicated by the target point position bit stream, and (c) the corrected position data, and wherein the target point bit stream acquisition unit acquires the target point attribute bit stream indicating a clock time at which the target point has been generated.

* * * * *